Jan. 30, 1973 TANEKATSU TORII 3,714,389

METHOD OF BUTT-WELDING A TUBING TO A BASE METAL

Filed Feb. 12, 1971

INVENTOR

T. TORII

BY Cushman, Darby & Cushman

ATTORNEYS

United States Patent Office 3,714,389
Patented Jan. 30, 1973

3,714,389
METHOD OF BUTT-WELDING A TUBING TO A BASE METAL
Tanekatsu Torii, Anjo, Japan, assignor to Nippondenso Kabushiki Kaisha, Kariya-shi, Japan
Continuation-in-part of abandoned application Ser. No. 1,686, Jan. 9, 1970. This application Feb. 12, 1971, Ser. No. 114,886
Claims priority, application Japan, Feb. 19, 1969, 44/12,378; Mar. 25, 1970, 45/24,994
Int. Cl. B23k 9/02
U.S. Cl. 219—104                                3 Claims

ABSTRACT OF THE DISCLOSURE

A method of butt-welding a tubing to a metallic vessel. A tubing of a metal is axially pressed by a pair of mold members having axially and radially confined cavity portions. The pressed tubing is caused to have radially outward buckling deformation which the cavity portions cooperate to shape into a flange. Another piece of a metal is prepared and is formed therein with a recess. The three members are assembled together with said flange being received in said recess and sandwiched between the two other members. Thereafter, butt-welding is performed to simultaneously weld said flange to the two other members.

CROSS-REFERENCE TO RELATED APPLICATION

This is a continuation-in-part application of U.S. patent application Ser. No. 1,686 filed Jan. 9, 1970 by Tanekatsu Torii (and now abandoned).

The present invention relates to a method of butt-welding a tubular material of a metal to a base metal such as a metallic vessel for a material such as pressurized fluid. Particularly, but not restrictively, the invention is concerned with a method of simultaneously butt-welding a tubing to such a metallic vessel together with another piece of a metal received on the tubing so that the vessel is provided with an inlet or outlet means therefor.

In rigidly mounting or bonding a tubular material to a vessel of the kind mentioned, an acetylene gas welding, arc welding, brazing or calking is conventionally and widely employed. It is difficult for calking to hermetically connect two members and a tubing together. For this reason, it is known that brazing is required to seal the calked portion of the members.

Arc welding enables one to hermetically connect metal members together but falls short of satisfaction in that this welding method provides a lesser preciseness in dimension at the welded or connected portion and, in addition, requires complicated steps of process which need a great deal of time and a large amount of expense.

With brazing, it is required to heat the members to be connected together to such an elevated temperature that deformation such as strain will be produced in the materials of the members. In addition, if it is attempted to deal with a plurality of sets of members at one time so as to reduce the time for the working, an expensive bulky equipment is required.

In order to solve the above-stated problems, the above-mentioned applicant's co-pending U.S. patent application Ser. No. 1,686 discloses and claims a method of butt-welding a tubular material to a base metal, said method comprising the steps of preparing a tubing of a metal to be welded to said base metal, forming a flange on the periphery of said tubing, holding said tubing in such a manner that said flange is in pressure contact with said base metal and butt-welding said tubing at said flange to said base metal. The butt-welding method disclosed in the above-mentioned co-pending application provides advantages that:

(1) It is not required to pre-heat the members to be welded together and the welding is performed in several seconds;
(2) The welding is carried out by the heat produced by electrical resistance so that the heat during welding operation is produced within a localized or limited area with a result that no deformation is formed and, hence, a welding of a better quality is obtainable; and
(3) As combustible materials or gases are not used, easier and safer operation is assured throughout the process and this makes it possible to obtain a welding of better quality in a shortened time and at a reduced expense.

While the butt-welding method disclosed in the above-mentioned co-pending application provides remarkable advantages over the prior art weldings as stated in the above, the method falls slightly in short of complete satisfaction in the view point of the aesthetic in that, with the butt-welding method concerned, the flange of a tubing welded to a base metal is positioned and appears on the surface thereof.

SUMMARY OF INVENTION

The present invention, therefore, contemplates an improvement in the butt-welding method disclosed and claimed in the above-mentioned co-pending patent application.

According to the present invention, there is provided a method of butt-welding a tubular material to a base metal, including the steps of preparing a tubing to be welded to said base metal and forming a flange on the peripheral surface of said tubing, the improvement comprising preparing another piece of a metal, forming a recess in the surface of at least one of said base metal and said another piece of a metal, assembling said base metal, tubular material and another piece of metal in such a manner that said flange is placed in said recess and simultaneously butt-welding said three members together.

Preferably, the recess formed in at least one of the base metal and the said another piece of metal has a shape which is substantially complementary to the shape of, but is slightly larger than, the flange formed on the tubular material. In addition, the recess advantageously has its axial dimension or depth slightly less than the axial dimension or thickness of the flange so that, in the butt-welding operation, the current supplied to one of the base metal and the said another metal piece from a butt-electrode in electrically conductive contact therewith is caused to flow through the flange on the tubular material to the other of the two members to thereby fuse the flange thereto by virtue of the electrical resistance.

Preferably, the arrangement is such that the volume of the flange on the tubular material is substantially the same as the volume of the space defined by the recess formed in at least one of the base metal and the said another piece of metal so that, after the welding, the recess is substantially just filled with the material of the flange.

In some practical instances, however, the flange may have some excessive amount of material as compared with the volume of the space defined by the recess. The part of the material of the flange in excess of the volume of the recess may advantageously be displaced or removed from the interior of the recess and extend or protrude radially inwardly into the space defined by the inner cylindrical wall of the flanged portion of welded tubular material. Such radially inward protrusion, however, will not be to such an extent that the tubular material concerned becomes clogged if the volume of the space defined by the recess with respect to that of the flange falls within a predetermined range of tolerance. This range may be relatively wider because such a radially inward protrusion to some extent will be negligible. For this reason, recessed metal pieces and flanged tubular materials may be mass-produced in advance of welding operation.

In a preferred embodiment of the invention, the prepared tubing is subjected to an axial pressure to cause a radially outward buckling deformation to be produced at a predetermined point of the length of the tubing and to cause the radially and outwardly deformed material to flow into an axially and radially confined annular space to thereby form a flange on the peripheral surface of the tubing. Preferably, such flange is formed by use of a pair of mold members movable toward and away from one another and each having an axially elongated cavity for receiving a part of the length of the tubing and a radially and axially confined cavity portion for defining a part of the said radially and axially confined space.

Alternatively, drawing process by use of rollers may be employed to form a flange on a tubing in the case where the tubing has relatively larger diameter and relatively thinner wall.

The above and other objects, features and advantages of the present invention will be made apparent from the following description with reference to the accompanying drawings.

DESCRIPTION OF A PREFERRED EMBODIMENT

Figure 1:
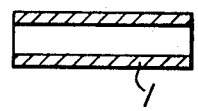
FIG. 1 is a longitudinal sectional view of a tubular material to be welded to a base metal.
Figure 2:
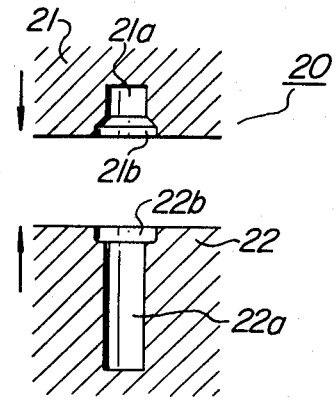
FIG. 2 is a fragmentary schematic axial sectional view of a device for forming a flange on the tubular material.

A tubular material 1, as shown in FIG. 1, is prepared. The material 1 is then worked by a flange forming device 20 which comprises a pair of upper and lower formers or mold members 21 and 22 movable toward and away from one another. The mold members 21 and 22 are provided therein with axially elongated cavities 21a and 22a, respectively, for receiving therein a part of the tubular material 1. The arrangement is such that the cavities 21a and 22a are in axial alignment with each other and the total of the depths or axial dimensions of the cavities is somewhat smaller than the longitudinal dimension or length of the tubular material 1 for the purpose to be described later. Moreover, the cavities 21a and 22a are of a diameter substantially the same as or slightly larger than that of the tubular material 1. The cavities include radially expanded cavity portions 21b and 22b, respectively, as shown in FIG. 2. Preferably, one of the mold members 21 has its cavity 21a shallower than the cavity 22a in the other mold member 22.

Figure 3A:
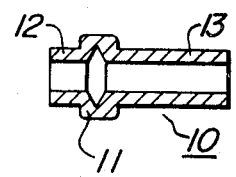
FIGS. 3a and 3b are axial sectional view and end view, respectively, of the tubular material which is formed with a flange thereon.
Figure 3B:
Figure 4:
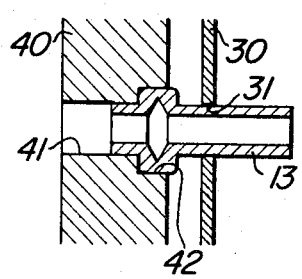
FIG. 4 illustrates in fragmentary section the forms of a base metal, another piece of a metal, and the tubular material placed in position before butt-welding operation.

The tubular material 1 is placed in one of the mold cavities and then the mold members 21 and 22 are forced to move toward each other or in the directions indicated by the arrows shown in FIG. 2 until they are brought into pressure contact with one another. As described in the above, the total of the depths of the mold cavities 21a and 22a is smaller than the length of the tubular material 1 so that, when the upper and lower mold members 21 and 22 are forced to contact each other as described in the above, the material 1 is subjected to axial compression to form a radially outward buckling deformation. More specifically, the material corresponding to the part of the length of the tubing 1 in excess of the total depths of the mold cavities 21a and 22a is forced to flow into the axially and radially confined annular space defined by the cavity portions 21b and 22b, with a result that the worked tubular material 10 is deformed to have an annular or radially outwardly extending flange 11 on the peripheral outer surface thereof and axially extending tubular portions or stems 12 and 13, as shown in FIGS. 3a and 3b.

In the case where tubular material 1 to be worked to have such a flange has a relatively larger diameter and a relatively thinner wall, drawing process by means of rollers may preferably be employed to shape the tubular wall of the material 1 at a point of the length thereof into a radially extending flange such as 11.

The aforestated steps of process are already disclosed in the above-mentioned co-pending patent application.

A base metal, which in this embodiment is a metallic vessel 30 for a pressurized fluid, is formed in the wall thereof with an opening 31 for receiving one of the stems 13 of the flanged tubular material 10. In addition, another piece of a metal 40 is prepared and formed therein with an opening 41 for receiving the other stem 12 of the flanged tubing 10. The metal piece 40 is further formed with a recess 42 coaxial with the opening 41 for receiving the flange 11 of the flanged tubing 10.

The stem 12 of the flanged tubular material 10 is then inserted into the opening 41 in the metal piece 40 until the side of the flange 11 adjacent the stem 12 is reached by the bottom face of the recess 42 in the metal piece 40. For this purpose, it will be apparent that the recess 42 has its shape which is substantially complementary to but slightly larger in section than that of the flange 11 on the tubular material 10 so that the flange can be received in the recess. It is, however, preferred that the flange 11 has its volume which is substantially the same as that of the space defined by the recess 42 for the reason to be described later. For this purpose, the flange 11 is preferably shaped to have its thickness or axial dimension which is slightly greater than the depth or axial dimension of the recess 42.

Then, the assembly is moved toward the metallic vessel 30 to insert the other stem 13 of the flanged tubular material 10 into the opening 31 in the wall of the vessel 30 until the flange 11 is sandwiched between the metal piece 40 and the wall of the vessel 30. In this position, the metal piece 40 is slightly spaced from the opposite surface of the wall of the vessel 30 for the reason described in the above.

Figure 5:
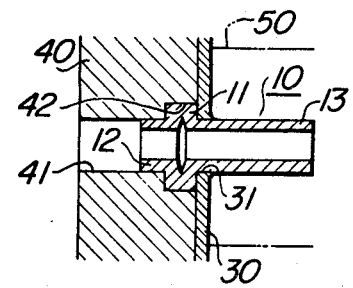
FIG. 5 illustrates in fragmentary section the flanged tubing, the base metal and the piece of metal which are butt-welded together according to the present invention.

Then, a butt-electrode 50 is placed in contact with the peripheral edge portion of the opening 31 in the vessel 30 in a manner as shown by broken lines in FIG. 5 and is forced to urge the wall of the vessel 30 toward the metal piece 40 with the flange on the tubular material 10 being sandwiched therebetween. Simultaneously, current is supplied to the electrode 50 so that a greater current is caused to flow from the vessel 30 through the flange 11 to the metal piece 40. The flange 11 is therefore red-heated and deformed by the electrical resistance to fill up the space defined by the recess 42 in the metal piece 40. The portions of the members 30 and 40 in contact with the heated flange 11 are melted so that the three members, i.e., the tubular material 10, the vessel 30 and the metal piece 40 are completely fused or welded together. The material of the flange 11 in excess of the volume of the space defined by the recess 42 in the metal piece 40 may be displaced or removed from the interior of the recess so that the removed material extends radially inwardly into the space defined by the inner surface of the flanged portion of the tubular material 10 when the flange 11 is electrically heated to melt and is axially and radially pressed by the adjacent walls of the metal piece 40 and the vessel 30. However, the radially inward extension due to the deformation of the flange will not be to such an extent that the welded tubular material 10 becomes clogged if the volume of the space defined by the recess 42 with respect to that of the flange 11 of the tubular material 10 is determined appropriately as stated in the above.

Thus, the butt-welding according to the present invention is free from the drawback that, when a tubular material such as 1 as shown in FIG. 1 is directly butt-welded to a base metal according to conventional butt-welding method, a deformation is produced at the welded portion of the tubular material to such an extent that the latter becomes clogged. In addition, the welding according to the present invention can provide a remarkably increased area of welded surfaces. This is because the flange 11 of the tubular material 10 is welded to the wall of the vessel 30 and, in addition, another piece of metal 40 is welded over the flange and to the vessel 30. This feature of the invention also provides a remarkable improvement in the mechanical strength and aesthetic appearance of the welding. It is further to be noted that the welding according to the present invention possesses all of the advantages of the butt-welding method by the above-mentioned co-pending application over conventional welding method of this kind.

With the above-described embodiment of the present invention, only the piece metal 40 is formed with the recess 42. It is, however, a matter of course that alternatively the base metal 30 or both of the latter and the metal piece 40 may be formed with such a recess or recesses with a resultant butt-welding of a similarly better quality. It will be apparent that, in the latter instance, the axial dimension of the flange may preferably be slightly greater than the total of the depth or axial dimensions of the recesses in the base metal and another metal piece.

What is claimed is:

1. A method of butt-welding a tubing to first and second metal members, including the steps of:
    forming a radially outwardly extending flange on the peripheral outer surface of said tubing at a position intermediary of the ends thereof,
    forming a first opening and a coaxial recess in said first member, said opening being substantially complementary to the peripheral outer surface of said tubing and said recess having an axial dimension slightly less than the axial dimension of said flange and an inner diameter slightly larger than the outer diameter of said flange,
    forming in said second member a second opening substantialy complementary to the outer peripheral surface of said tubing,
    assembling said tubing and said first and second members together in such a manner that one end of said tubing is inserted through said recess and into said first opening in said first member and the other end of said tubing is inserted through said second opening in said second member until side faces of said flange are brought into abutment contact with the bottom of said recess in said first member and one face of said second member, respectively, and
    causing electrical current to flow through said first and second members and said flange while pressure is applied to said first and second members to urge them toward each other to axially press the material of said flange therebetween for radially expanding the flange, whereby the space defined in said recess is filled with at least a part of the material of said flange to weld said tubing at said flange to said first and second members.

2. A butt-welding method as claimed in claim 1, wherein said step of forming a flange comprises steps of imparting an axial pressure to said tubing while it is radially confined so as to avoid a radial deformation thereof in all portions except the portion at which said flange is formed, thereby causing a part of the material of said tubing to flow to produce a buckling deformation extending radially outwardly from said tubing, and confining said flow of material at radial positions corresponding to the outer peripheral surface of said flange and at axial positions corresponding to the side faces of said flange.

3. A butt-welding method as claimed in claim 1, characterized by the fact that said recess is formed to define a space the volume of which is substantially the same as the volume of said flange whereby, after the welding, the recess is substantially just filled with the material of said flange.

References Cited

UNITED STATES PATENTS

| | | | |
|---|---|---|---|
| 2,583,868 | 1/1952 | Mocium | 219—107 |
| 1,496,966 | 6/1924 | Ailar | 219—107 |
| 2,321,201 | 6/1943 | Heilman | 219—107 X |
| 1,292,812 | 1/1919 | Lachman | 219—107 |

JOSEPH V. TRUHE, Primary Examiner

L. A. SCHUTZMAN, Assistant Examiner

U.S. Cl. X.R.

29—471.1, 475; 219—107